US011407288B2

(12) United States Patent
Kim et al.

(10) Patent No.: US 11,407,288 B2
(45) Date of Patent: Aug. 9, 2022

(54) AIR VENT FOR AUTOMOBILE

(71) Applicant: NIFCO KOREA INC., Asan-si (KR)

(72) Inventors: Seong Keon Kim, Gyeonggi-do (KR);
Sun Hyeon Kwon, Chungcheongnam-do (KR)

(73) Assignee: NIFCO KOREA INC., Chungcheongnam-Do (KR)

( * ) Notice: Subject to any disclaimer, the term of this patent is extended or adjusted under 35 U.S.C. 154(b) by 217 days.

(21) Appl. No.: 16/592,505

(22) Filed: Oct. 3, 2019

(65) Prior Publication Data
US 2020/0122553 A1  Apr. 23, 2020

(30) Foreign Application Priority Data
Oct. 17, 2018  (KR) .......................... 10-2018-0123872

(51) Int. Cl.
B60H 1/34 (2006.01)
(52) U.S. Cl.
CPC ................. B60H 1/3421 (2013.01)
(58) Field of Classification Search
CPC ............. B60H 1/3421; B60H 1/3414; B60H 2001/3471; B60H 2001/3478; B60H 2001/3492
USPC ...................................................... 454/155
See application file for complete search history.

(56) References Cited

U.S. PATENT DOCUMENTS

| 6,533,655 | B2 | 3/2003 | Demerath et al. |
| 9,370,986 | B2 | 6/2016 | Londiche et al. |
| 9,963,015 | B1 | 5/2018 | Fraser et al. |
| 10,131,210 | B2 * | 11/2018 | Belzons ............... B60H 1/3421 |
| 10,625,575 | B2 | 4/2020 | Lee et al. |
| 2002/0081965 | A1 | 6/2002 | Demerath et al. |

(Continued)

FOREIGN PATENT DOCUMENTS

DE      69309973 T2   7/1997
DE   102011056079 A1   6/2013
(Continued)

OTHER PUBLICATIONS

Korean Notice of Allowance issued for Korean Patent Application No. 10-2018-0123872 dated Jun. 2, 2020.

(Continued)

*Primary Examiner* — Avinash A Savani
*Assistant Examiner* — Dana K Tighe
(74) *Attorney, Agent, or Firm* — Thomas Horstemeyer, LLP

(57) ABSTRACT

Provided is an air vent for an automobile having a duct having a passage, a knob mount coupled to the duct, a knob installed to the knob mount, first and second vane members installed to the knob mount, a vane driving device installed to the knob mount, and a damper installed in the duct. The knob is movable leftwards and rightwards and is rotatable upwards and downwards. The first vane member is rotated upwards and downwards by the vane driving device when the knob is rotated upwards and downwards. The second vane member is rotated leftwards and rightwards by the vane driving device when the knob is moved leftwards and rightwards. The vane driving device transmits the rotation of the knob to the first vane member, and transmits the movement of the knob to the second vane member. The damper opens or closes the passage by rotation.

7 Claims, 13 Drawing Sheets

(56) References Cited

U.S. PATENT DOCUMENTS

| | | | |
|---|---|---|---|
| 2015/0210143 A1 | 7/2015 | Schlippe | |
| 2016/0288624 A1* | 10/2016 | Albin | B60H 1/3421 |
| 2017/0259649 A1* | 9/2017 | Shibata | B60H 1/3421 |
| 2018/0086182 A1* | 3/2018 | Gareis | B60H 1/3421 |
| 2018/0170153 A1 | 6/2018 | Lee et al. | |

FOREIGN PATENT DOCUMENTS

| | | |
|---|---|---|
| DE | 102014203511 B3 | 4/2015 |
| EP | 0551883 A1 | 7/1993 |
| JP | 2002192940 A | 7/2002 |
| JP | 2004256014 A | 9/2004 |
| KR | 101283132 B1 | 7/2013 |
| KR | 20150091006 A | 8/2015 |
| KR | 1020180072186 A | 6/2018 |

OTHER PUBLICATIONS

German Office Action issued in German Application No. 10 2019 126 454.5 dated Feb. 22, 2022.

\* cited by examiner

AIR VENT FOR AUTOMOBILE

CROSS-REFERENCE TO RELATED APPLICATION

This application is based upon and claims the benefit of priority from Korean Patent Application No. 10-2018-0123872, filed on Oct. 17, 2018, the entire contents of which are incorporated herein by reference.

TECHNICAL FIELD

The present disclosure relates to an air vent for an automobile.

BACKGROUND

Automobiles may be considered as necessities of life for modern people, and thus, the number of users of automobiles is growing exponentially.

As a result, drivers who use automobiles tend to show great interest in not only basic types of automobile performance such as driving comfort, riding comfort, speed, and stability, but also use convenience and efficiency.

In particular, an internal environment of an automobile related to cooling and heating greatly influences the driving efficiency of a driver, and efficiency maximization of cooling and heating is very important in terms of fuel efficiency of the automobile.

An air vent used in the automobile is used in an automobile air conditioner. The air conditioner is installed at an automobile's inner side end portion of a housing to provide cool/hot air currents generated from an evaporator and a heater to an inside of the automobile.

An air vent for an automobile is known to be configured such that a plurality of vanes are rotatably installed in an air outlet of a main body to adjust a direction of air discharged into an automobile or to open/close the air outlet of the main body.

An example of such an air vent for an automobile is disclosed in Korean Patent Publication No. 10-2015-0091006 (published Aug. 7, 2015) or the like.

However, since such an air vent requires a large space in which the plurality of vanes are installed, there are many limitations on an installation space. Since a separate vane link should be provided in order for a wind direction to be vertically adjustable, it is difficult to reduce a size of the air vent for an automobile. Therefore, when designing an interior of the automobile, it is impossible to create a desired design.

PRIOR ART DOCUMENT

Patent Document

Korean Patent Publication No. 10-2015-0091006 (published on Aug. 7, 2015)

SUMMARY

Various embodiments of the present disclosure provide an air vent for an automobile that adjusts leftward and rightward wind directions and upward and downward wind directions by a single knob and opens or closes an air passage by a damper rotated by the knob. Therefore, an installation space and a manipulation space of the air vent are minimized, a shape of the air vent becomes slim, and a size of the air vent is reduced, thereby freely installing the air vent in the interior of an automobile without limitation on an installation space and easily allowing the interior of an automobile to have a desired design.

An air vent for an automobile according to an embodiment of the present disclosure includes a duct, a knob mount, a knob, a first vane member, a second vane member, a vane driving device, and a damper. The duct has a passage formed therethrough. The passage defines an air outlet and an air inlet. The knob mount is fixedly coupled to the duct. The knob is installed to the knob mount so as to be movable leftwards and rightwards and is rotatable upwards and downwards. The first vane member is configured to be rotated upwards and downwards to adjust an upward and downward wind direction when the knob is rotated upwards and downwards. The second vane member is configured to be rotated leftwards and rightwards to adjust a leftward and rightward wind direction when the knob is moved leftwards and rightwards. The vane driving device is installed to the knob mount. The vane driving device is configured to transmit an upward and downward rotation of the knob to the first vane member such that the first vane member is rotated upwards and downwards, and to transmit a leftward and rightward movement of the knob to the second vane member such that the second vane member is rotated leftwards and rightwards. The damper is installed in a direction of the air inlet of the duct and is configured to open or close the passage by rotation.

In an embodiment, the vane driving device includes a knob shaft, a knob shaft gear, and a vane rotating portion. The knob shaft is installed to the knob mount so as to moved and rotated in a direction in which the knob is manipulated. The knob shaft gear is installed to the knob shaft to rotate the first vane member. The knob shaft gear is configured to be rotated together with the knob shaft when the knob shaft is rotated upwards and downwards, and not to be moved when the knob shaft is moved leftwards and rightwards. The vane rotating portion is coupled to the knob shaft and is connected to the second vane member to rotate the second vane member leftwards and rightwards.

In an embodiment, the first vane member has a gear portion that is gear-connected to the knob shaft gear. When the knob shaft is rotated, the knob shaft gear is rotated together with the knob shaft and transmits the rotation of the knob shaft to the gear portion. Therefore, the first vane member is rotated along with the rotation of the knob shaft, thus adjusting the upward and downward wind direction.

In an embodiment, the air vent includes a damper driving device that is configured to interconnect the knob shaft with the damper and to rotate the damper by a movement of the knob shaft.

In an embodiment, the damper driving device includes a cam driving portion, a cam, and a link mechanism. The cam driving portion is fixedly installed to the knob shaft and has a cam pin. The cam is rotatably coupled to the knob mount and has a cam groove to which the cam pin is slidably inserted. The cam is configured to be rotated by interaction between the cam pin and the cam groove when the knob shaft is moved leftwards or rightwards. The link mechanism is configured to transmit a rotation of the cam to the damper to rotate the damper.

In an embodiment, the second vane member has a link pin spaced from a rotation center of the second vane member, and the vane rotating portion has a guide slot that allows the link pin to slide while being guided along the guide slot.

Therefore, when the knob shaft is moved leftwards and rightwards by the knob, the link pin slides along the guide slot.

In an embodiment, the guide slot has a first slot extending obliquely with respect to the knob shaft, and a second slot extending from the first slot in parallel with the knob shaft. The link pin slides along the first slot when the second vane member is rotated leftwards and rightwards. The link pin slides along the second slot when the second vane member is not rotated.

In an embodiment, the damper driving device includes a stopper coupled to the knob mount. The stopper applies resistance to the movement of the knob shaft when the link pin enters the second slot from the first slot.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Embodiments of the present disclosure are illustrated for the purpose of explaining the technical idea of the present disclosure. The scope of the rights according to the present disclosure is not limited to the embodiments presented below or the detailed descriptions of such embodiments.

All the technical terms and scientific terms in the present disclosure include meanings or definitions that are commonly understood by those of ordinary skill in the art unless otherwise defined. All terms in the present disclosure are selected for the purpose of describing the present disclosure more clearly, and are not selected to limit the scope of the present disclosure.

As used in the present disclosure, expressions such as "comprising", "including", "having", and the like are to be understood as open-ended terms having the possibility of encompassing other embodiments, unless otherwise mentioned in the phrase or sentence containing such expressions.

The singular expressions that are described in the present disclosure may encompass plural expressions unless otherwise stated, which will be also applied to the singular expressions recited in the claims.

In the present disclosure, the description that one element is "connected," "coupled," and "fixed" to another element should be appreciated to indicate that one element may be directly connected, coupled, or fixed, to another element, and should be further understood that a new element may be interposed between one element and another element.

Figure 1:
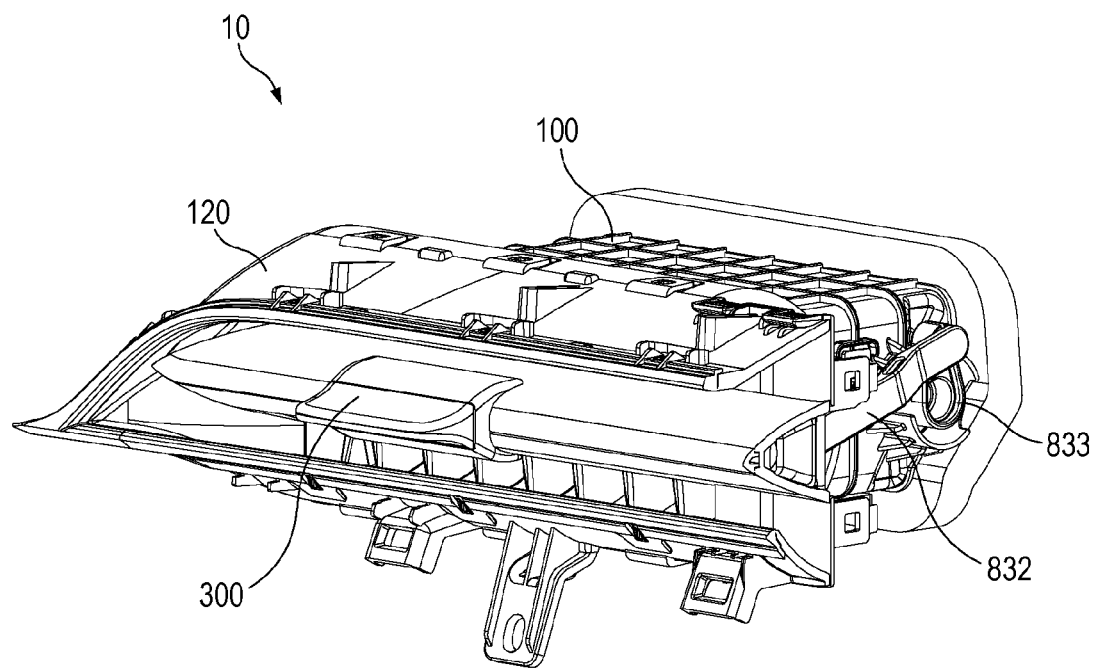
FIG. 1 is a perspective view showing an air vent for an automobile according to one embodiment of the present disclosure.
Figure 2:
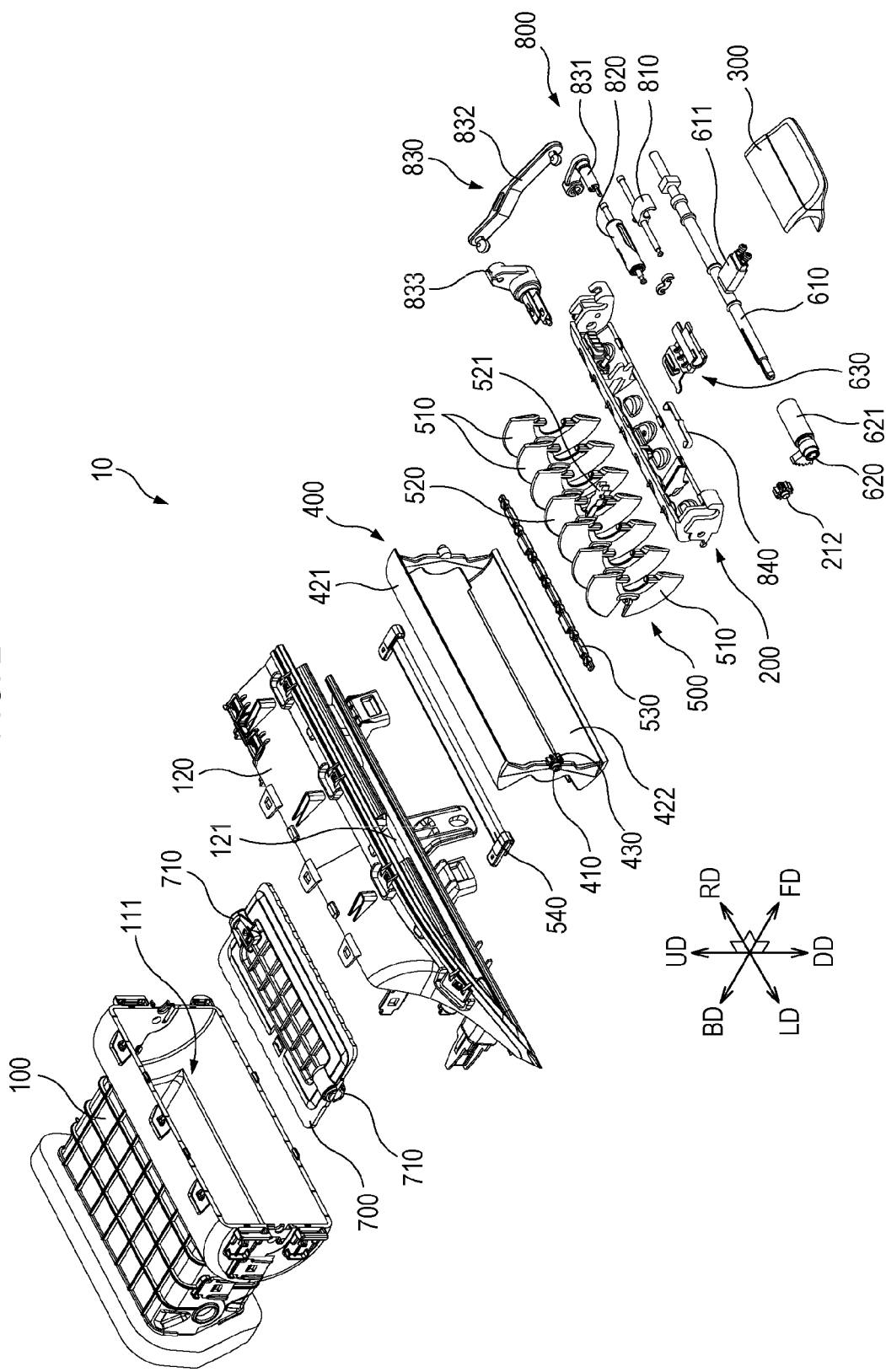
FIG. 2 is an exploded perspective view showing an air vent for an automobile according to one embodiment of the present disclosure.
Figure 3:
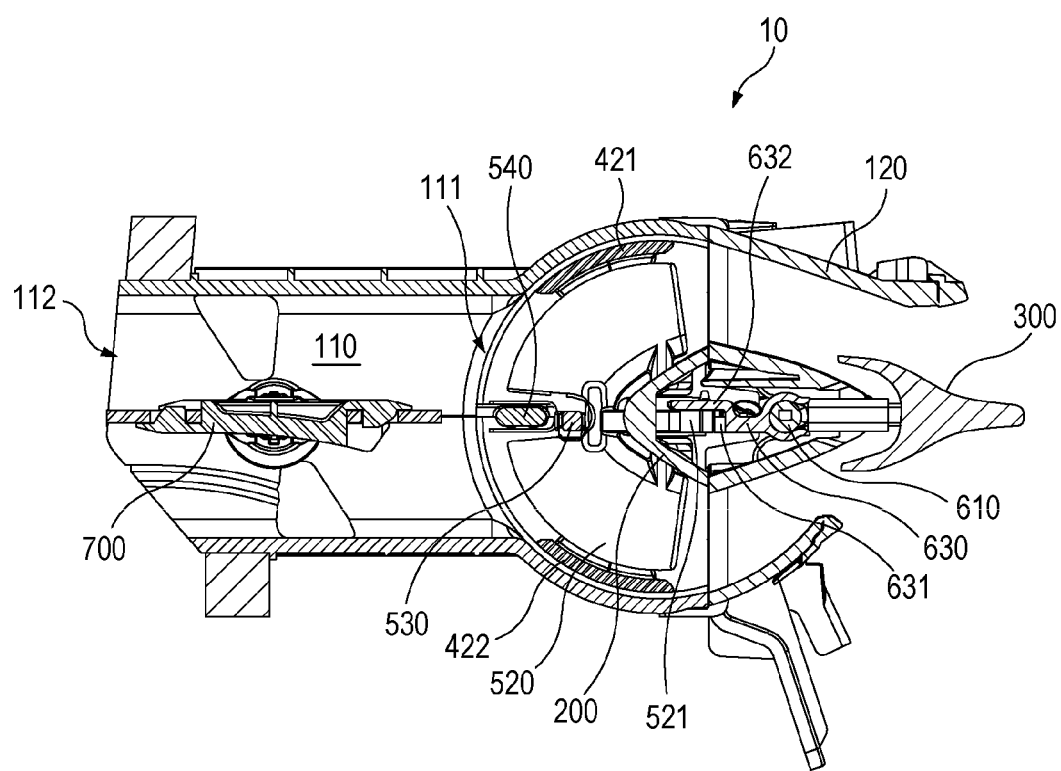
FIG. 3 is a side sectional view of the air vent shown in FIGS. 1 and 2.

The direction indication terms "frontward," "rearward," "upward," "downward," "leftward," and "rightward" as used herein may correspond to the directions of the arrows indicated by reference symbols FD, BD, UD, DD, LD and RD, respectively, shown in FIG. 2. These are merely given to describe the present disclosure for clear understanding thereof, and it goes without saying that the respective directions may be defined differently depending on where the reference is placed.

Descriptions are made hereinafter as to the embodiments of the present disclosure with reference to the accompanying drawings. Like reference numerals in the drawings denote like or corresponding elements. FIGS. 1 to 9 show the whole configuration or a partial configuration of an air vent for an automobile according to an embodiment, and FIGS. 10 to 15 show operation examples of an air vent for an automobile according to an embodiment.

Referring to FIGS. 1 to 9, an air vent 10 for an automobile according to an embodiment of the present disclosure includes a duct 100, a knob mount 200, a knob 300, a first vane member 400, a second vane member 500, a vane driving device 600, and a damper 700.

The duct 100 is formed with a passage 110 passing through the duct 100. A frontward side of the passage 110 defines an air outlet 111, and a rearward side of the passage 110 defines an air inlet 112. In an embodiment, a bezel 120 may be detachably coupled to a frontward end of the duct 100 in a direction of the air outlet 111 of the duct 100. The knob 300 may be coupled to the knob mount 200 through a through-hole 121 formed in the middle of the bezel 120.

The knob mount 200 is fixedly coupled to the frontward end of the duct 100 which defines the air outlet 111. For example, as shown in FIG. 2, the knob mount 200 may be configured to snap-engage with outer side surfaces of the duct 100 at respective ends of the knob mount by using snap-fit. The knob 300 is installed to the knob mount 200 and is configured to be movable leftwards and rightwards and rotatable upwards and downwards.

The first vane member 400 is configured to be rotated about a hinge shaft 410 thereof to adjust an upward and downward wind direction when the knob 300 is rotated upwards and downwards. The second vane member 500 is configured to be rotated leftwards and rightwards to adjust a leftward and rightward wind direction when the knob 300 is moved leftwards and rightwards.

The first vane member 400 is disposed within the frontward end of the duct 100 and may be coupled to the knob mount 200 so as to rotatable upwards and downwards. The first vane member 400 takes the form of a rectangular frame whose interior is empty. The first vane member 400 has a hinge shaft 410 protruding laterally, and an upper vane 421 and a lower vane 422 located opposite to each other upwards and downwards. The upper and lower vanes may have a width that approximately corresponds to the width of the air outlet. Further, the upper and lower vanes have a cross-sectional shape of a circular arc.

The second vane member 500 is disposed within the first vane member 400. The second vane member 500 may include a single or a plurality of vanes extending vertically. The second vane member of an embodiment includes a plurality of vanes 510, 520. Each vane of the second vane member 500 is coupled to a rearward end portion of the knob mount 200 so as to be rotatable leftwards and rightward. Further, each vane of the second vane member 500 is rotatably coupled to a link bar 520. For example, if a rotational force for leftward and rightward rotation is applied to the middle vane 520 among the plurality of vanes of the second vane member 500, then all the vanes of the second vane member can be rotated leftwards and rightwards by the link bar 520. The middle vane 520 is rotatably connected to the vane driving device 600. The middle vane 520 has a pinion gear portion 521 protruding frontward, and a link pin 522 protruding vertically from the pinion gear portion 521. The link pin 522 is formed at a position spaced from a rotation center of the middle vane 520. Further, the second vane member 500 has a transverse bar 540 coupled to the knob mount 200, and the transverse bar 540 extends through each vane of the second vane member 500.

The vane driving device 600 is installed to the knob mount 200, and drives the first vane member and the second vane member by the manipulation of the knob 300. The vane driving device 600 is configured to transmit the rotation of the knob 300 to the first vane member 400 such that the first vane member 400 is rotated upwards and downwards. Further, the vane driving device 600 is configured to transmit the leftward and rightward movement of the knob 300 to the second vane member 500 such that the second vane member 500 is rotated leftwards and rightwards.

In an embodiment, the vane driving device 600 includes a knob shaft 610, a knob shaft gear 620, and a vane rotating portion 630.

The knob shaft 610 is installed to the knob mount 200 so as to be movable. The knob shaft 610 is configured to be moved and rotated in a direction in which the knob 300 is manipulated. The knob shaft 610 has, at its middle, a connection piece 611 which protrudes frontwards, and through which the knob 300 is coupled to the knob shaft 610.

Figure 5:
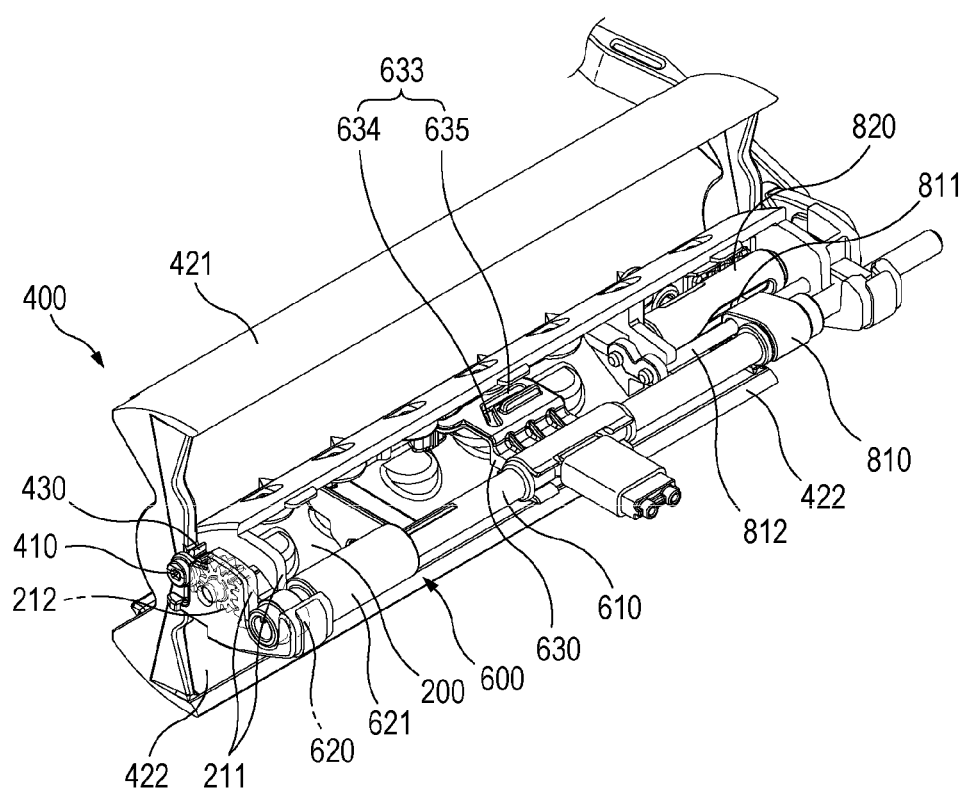
FIG. 5 is a perspective view showing a knob mount, a first vane member and a vane driving device.
Figure 6:
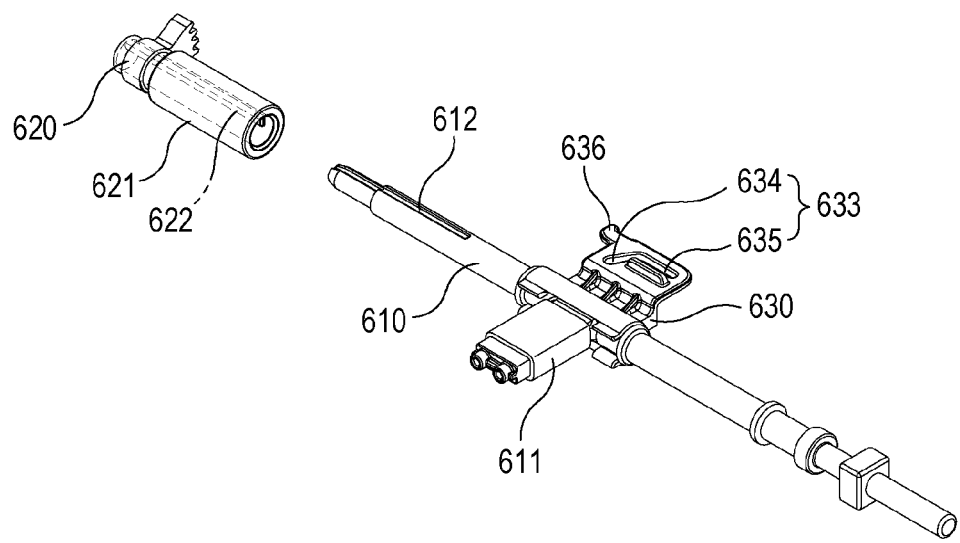
FIG. 6 is an exploded perspective view showing a vane driving device.
Figure 7:
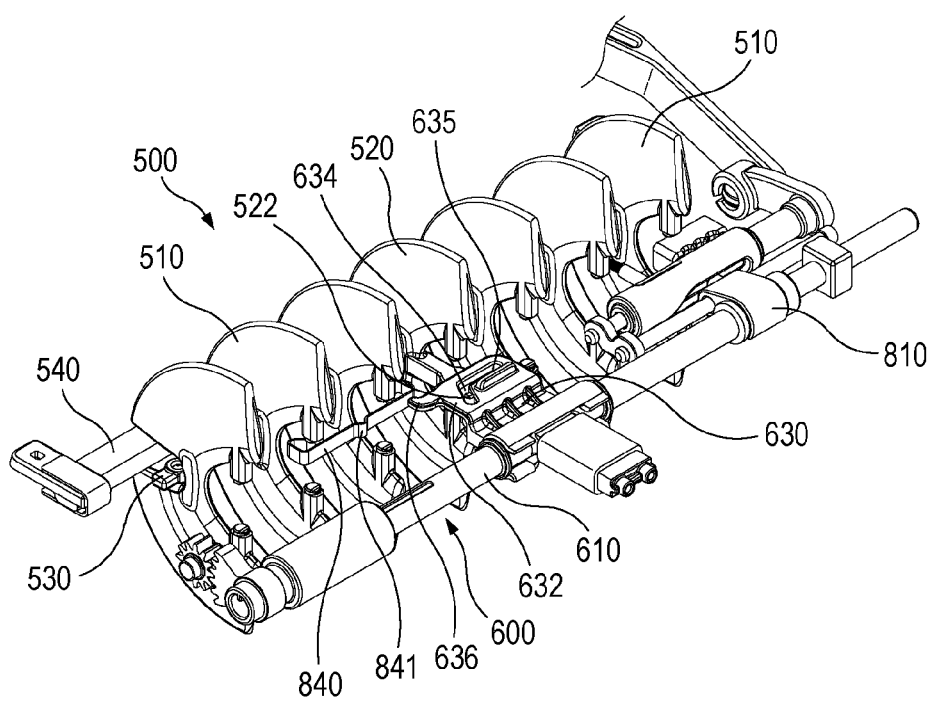
FIG. 7 is an upper perspective view showing a second vane member and a vane driving device.

The knob shaft gear 620 is positioned at one side end portion of the knob shaft 610 and rotates the first vane member 400. The knob shaft gear 620 is rotated together with the knob shaft 610 when the knob shaft 610 is rotated. As shown in FIGS. 2 and 6, a slide groove 612, which extends straight along a length direction of the knob shaft 610, is formed in the one side end portion of the knob shaft 610. Further, the knob shaft gear 620 has a protrusion 622 that protrudes within a cylindrical portion 621. The protrusion 622 is inserted into the slide groove 612. Since the protrusion 622 is in contact with the slide groove 612 in a circumferential direction of the knob shaft 610, the knob shaft gear 620 can be rotated together with the rotation of the knob shaft 610. The knob shaft gear 620 is configured not to be moved when the knob shaft 610 is moved leftwards and rightwards. As shown in FIG. 5, a pair of rails 311 extending vertically are formed in one side end portion of the knob mount 200. The knob shaft gear 620 is rotatably coupled to the one side end of the knob mount 200 such that the gear portion of the knob shaft is positioned between the pair of rails 311. Therefore, when the knob shaft 610 is moved leftwards and rightwards, the knob shaft gear 620 is not moved leftwards and rightwards.

Figure 4:
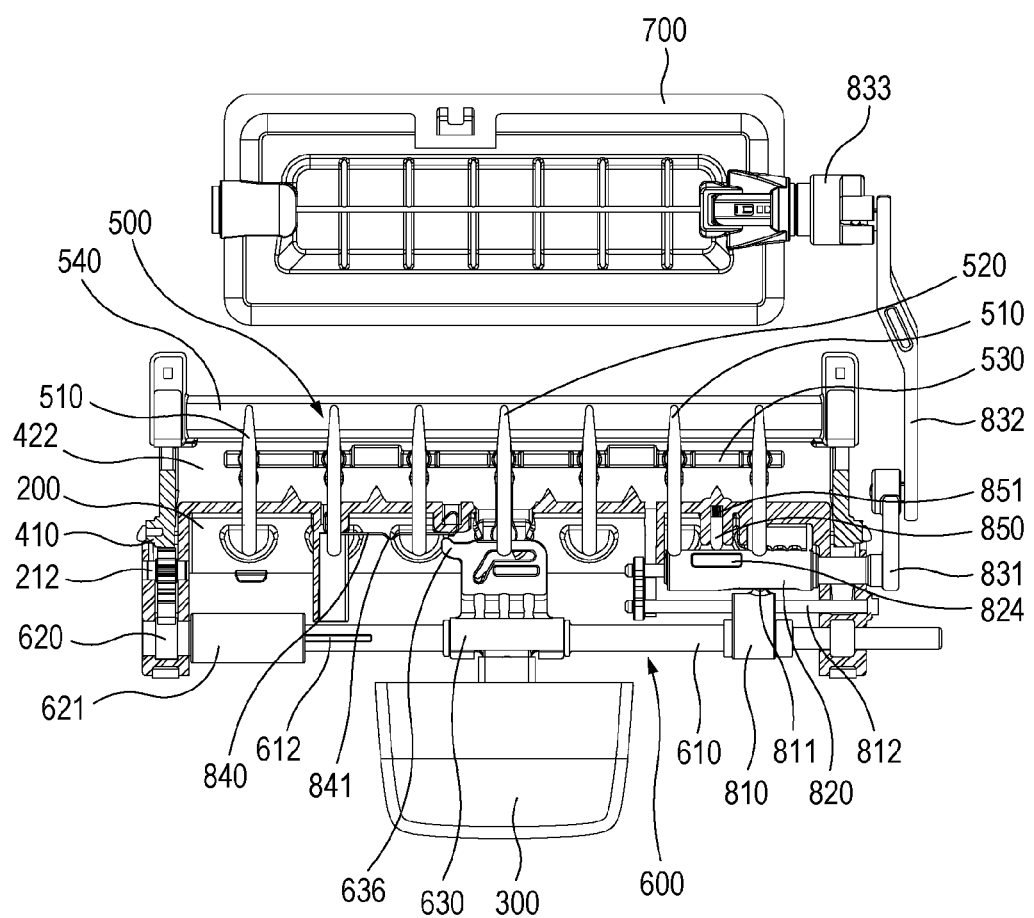
FIG. 4 is a plan view showing operating elements of the air vent shown in FIGS. 1 and 2.

The first vane member 400 can be rotated in the same direction as the rotation direction of the knob shaft 610. The first vane member 400 has, at its one side end (e.g., at the hinge shaft 410), a gear portion 430 that is gear-connected to the knob shaft gear 620. As shown in FIGS. 4 and 5, the knob shaft gear 620 and the gear portion 430 are gear-connected to each other via an intermediate gear 212. The intermediate gear 212 is rotatably coupled to the one side end of the knob mount 200.

The vane rotating portion 630 is connected to the second vane member 500 and rotates the second vane member 500 leftwards and rightwards. The vane rotating portion 630 may be connected to the second vane member 500 by gear-connection or pin-connection. The vane rotating portion 630 is fixedly coupled, at its front end, to the middle portion of the knob shaft 610. The front end of the vane rotating portion 630 has a hooked shape, and may be coupled to the knob shaft 610 with snap-fit. The vane rotating portion 630 is connected, at its rearward end, to the middle vane 520 and rotates the middle vane.

Referring to FIGS. 6 to 9, the vane rotating portion 630 has a rack gear portion 631 protruding rearwards. Further, the vane rotating portion 630 has a projection piece 632 protruding rearwards from the rack gear portion 631, and a guide slot 633 which is perforated through the projection piece 632 and has an approximately L or V shape. The vane rotating portion 630 and the middle vane 520 are connected to each other in such a manner that the pinion gear portion 521 and the rack gear portion 631 is in mesh with each other and the link pin 522 is inserted to the guide slot 633. The guide slot 633 allows the link pin 522 to slide while being guided along the guide slot 633.

The guide slot 633 has a first slot 634 and a second slot 635. The first slot extends obliquely with respect to the knob shaft 610. The second slot extends from an end of the first slot 634 in parallel with the knob shaft 610. As the knob shaft 610 is moved leftwards or rightwards, the rack gear portion 631 of the vane rotating portion is moved leftwards or rightwards. Therefore, the middle vane 620 is rotated leftwards or rightwards by the pinion gear portion 521 that meshes with the rack gear portion 631. Within the range in which the middle vane 520 is rotated leftward and rightward, the link pin 522 slides along the first slot 634 between both ends of the first slot 634. When the knob shaft 610 is moved beyond a predetermined limit, that is, when the second vane member 500 is rotated at a predetermined angle and cannot be rotated further, the link pin 522 enters the second slot 635 from the first slot 634 and can slide along the second slot 635.

The vane rotating portion 630 has, at its side end, a pushing hook 636 that protrudes in a hooked shape. The pushing hook 636 is related to the operation of a damper driving device 800.

The damper 700 is installed within the duct 100 in a direction of the air inlet 112 of the duct 100, and is configured to open or close the passage 110 by rotation. The damper 700 is rotatably coupled to the duct so as to be rotatable within the duct 100.

In an embodiment, the air vent includes a damper driving device 800 that interconnects the opposite side end portion of the knob shaft 610 with the damper 700 and is configured to rotate the damper 700 by the movement of the knob shaft 610. The damper driving device 800 includes a cam driving portion 810, a cam 820, and a link mechanism 830.

Figure 8:
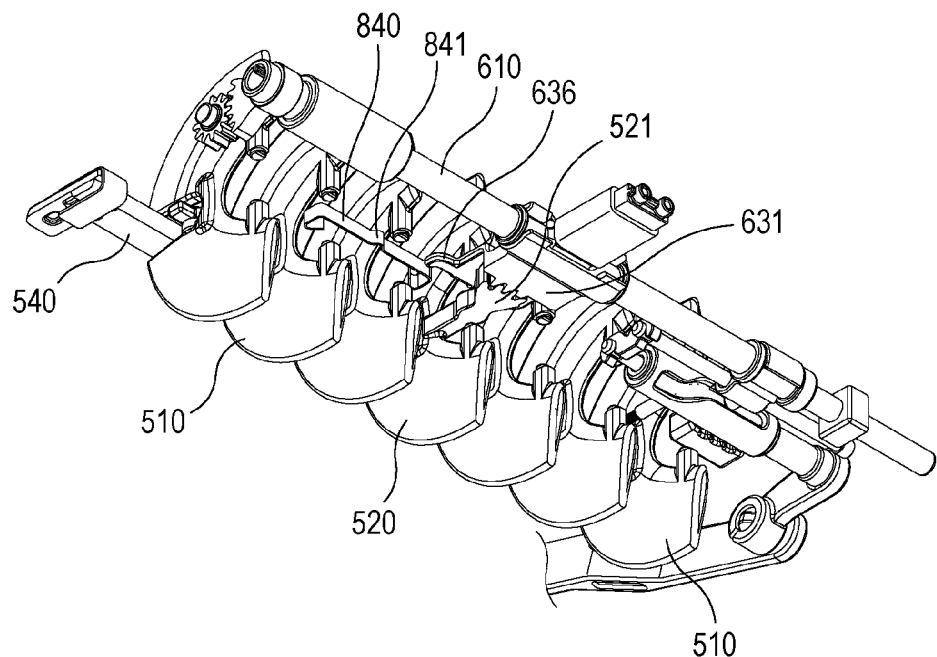
FIG. 8 is a lower perspective view showing a second vane member and a vane driving device.
Figure 9:
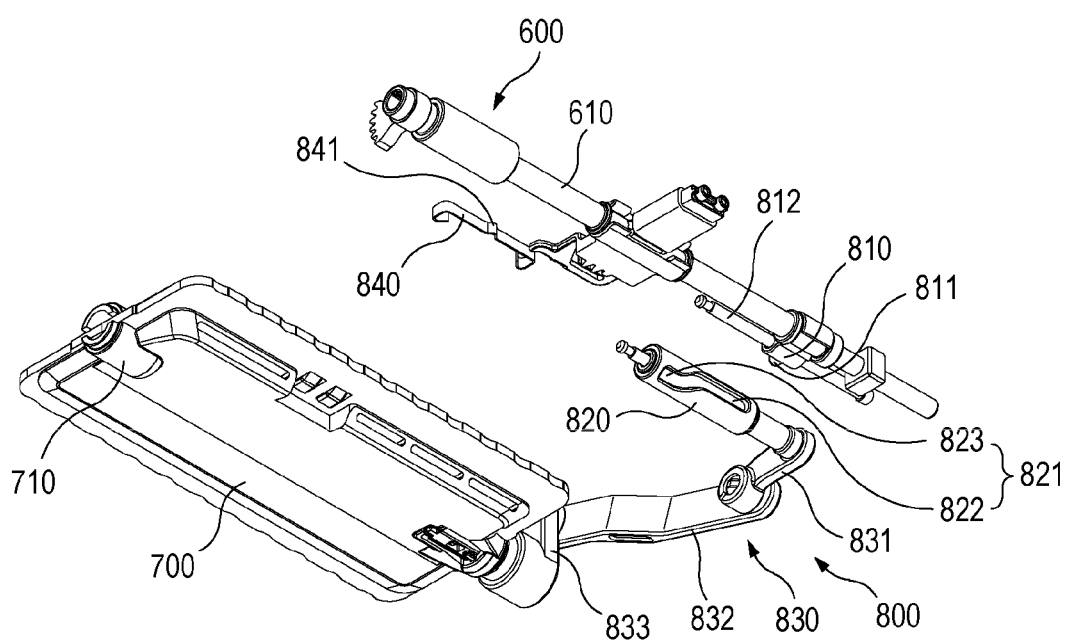
FIG. 9 is an exploded perspective view showing a vane driving device, a damper driving device and a damper.

As shown in FIGS. 2 and 8, the cam driving portion 810 is fixedly installed at the opposite side end portion of the knob shaft 610, and is moved together with the knob shaft 610. The cam driving portion 810 has a cam pin 810 protruding rearwards. The cam driving portion 810 may be guided along a guide bar 812 that passes through the cam driving portion 810 and is coupled to the knob mount 200.

The cam 820 may include a cylindrical cam. The cam 820 is rotatably coupled to the knob mount 200 in parallel with the knob shaft 610. The cam 820 has a cam groove 821 in its outer peripheral surface, and is configured to be rotated by interaction between the cam pin 811 and the cam groove 821 when the knob shaft 610 is moved leftwards and rightwards. The cam pin 811 is slidably inserted to the cam groove 821. The cam groove 821 includes a first cam groove 822 and a second cam groove 823. The first cam groove extends linearly in parallel with the knob shaft 821. The second cam groove extends from an end of the first cam groove in a direction oblique to the axial direction of the knob shaft 610. Within the range of the leftward and rightward rotation of the second vane member, the cam pin 811 is positioned in the first cam groove 822. When the knob shaft is moved beyond a predetermined limit exceeding the leftward and rightward rotation range of the second vane member, the cam pin 811 enters the second cam groove 823 from the first cam groove 822.

The link mechanism 830 transmits the rotation of the cam 820 to the damper 700 and rotates the damper 700. In an embodiment, the link mechanism includes a first link 831, a second link 832, and a third link 833. The cam 820 is coupled to the first link 831, and the cam 820 and the first link 831 are rotated together. The second link 832 is rotatably coupled to the first link 831 at its one end. The third link 833 is rotatably coupled to the opposite end of the second link 832. The third link 833 is coupled, at its opposite end, to the middle of the side edge of the damper 700.

Further, the damper driving device 800 includes a stopper 840 that is configured to apply resistance to the movement of the knob shaft. An occupant in an automobile can recognize the operation of the damper due to the resistance-applying action of the stopper 840. The stopper 840 may include a plate spring, and has a projection 841 at its middle. The stopper 840 is coupled to an inner frontward surface of the knob mount 200, and is positioned so as to contact with the pushing hook 636 of the vane rotating portion. At the time when the link pin 512 enters the second slot 635 from the first slot 634 along with the movement of the knob shaft 610, the pushing hook 636 of the vane rotating portion may be brought into contact with the stopper 610 and the stopper 840 may apply resistance to the movement of the knob shaft 610.

Further, the cam 820 may have a recess 824 at a position opposite to the cam groove 821, and a cam stopper 850 may be provided in the inner frontward surface of the knob mount 200. The cam stopper 850 is biased frontwards by a spring 851. If the cam 820 is rotated and the cam stopper 850 is inserted to the recess 824, the cam stopper 850 may apply stop action to the rotation of the cam 820.

The air vent according to one embodiment of the present disclosure may be configured as described above. The operation states of the air vent according to one embodiment are described below with reference to FIGS. 10 to 15.

Figure 10:
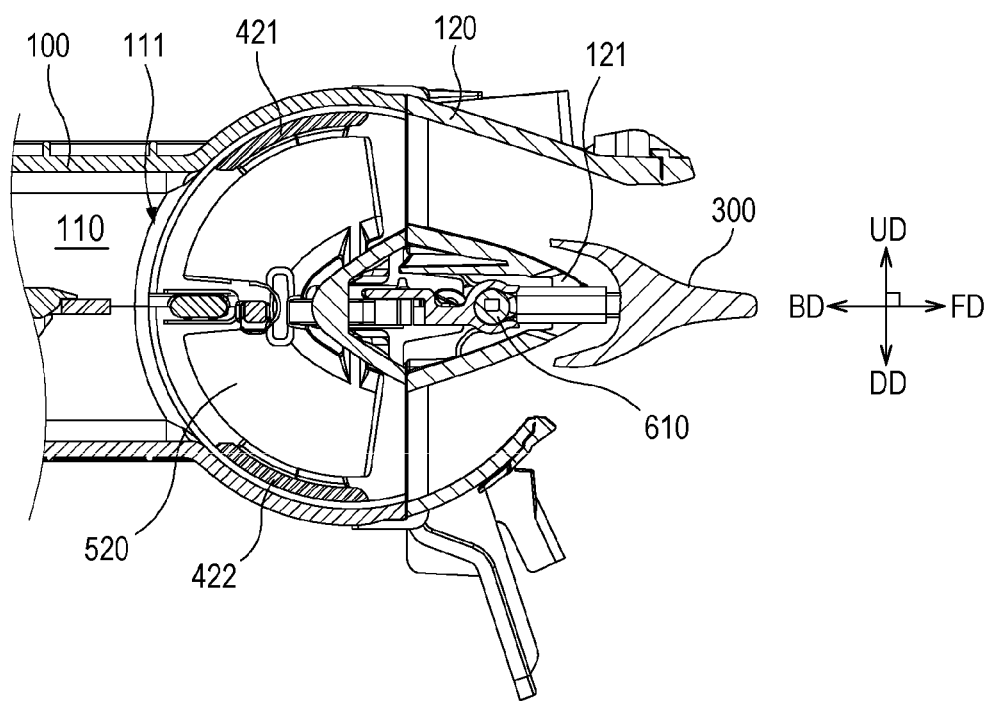
FIG. 10 shows an example where the air vent is operated to discharge air frontwards.

When the occupant in an automobile wants to direct the wind direction in the frontward direction, the occupant may position the knob at the middle of the air outlet. In the state where the knob 300 is positioned as shown in FIG. 10, the air vent is operated to discharge air frontwards.

Figure 11:
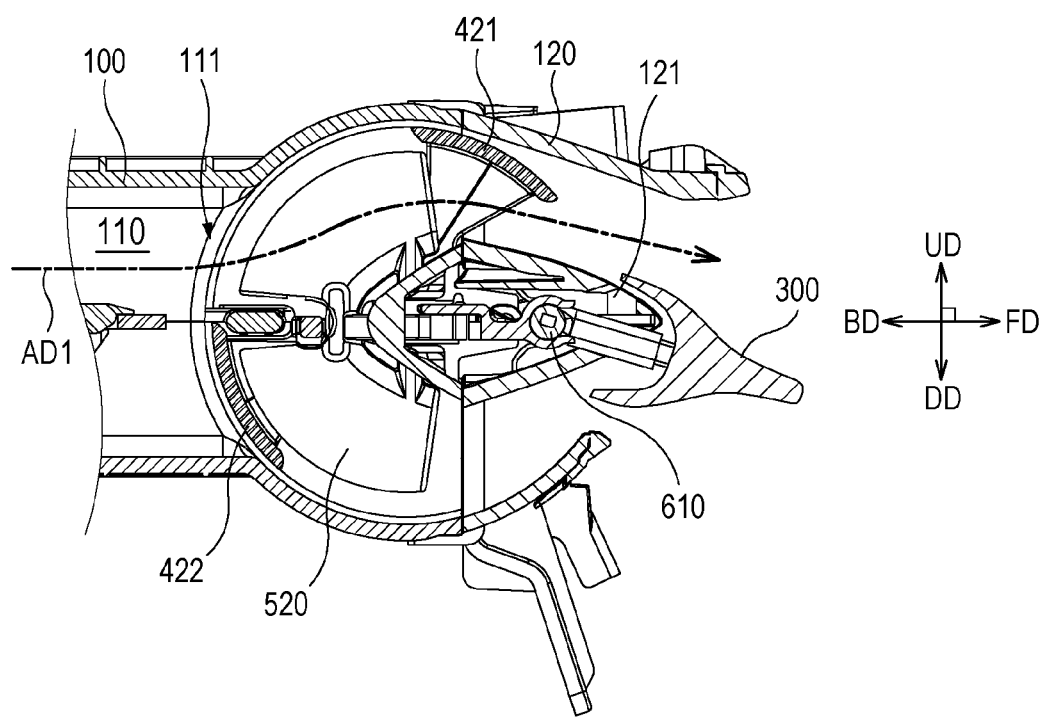
FIG. 11 shows an example where the air vent is operated to discharge air toward a lower side of an interior.

When the occupant wants to direct the wind direction toward a lower side of an interior of an automobile, the occupant may rotate the knob 300 toward the lower side of the interior. Referring to FIGS. 2 and 11, as the knob is rotated toward the lower side of the interior, the knob shaft 610 and the knob shaft gear 620 are rotated together with the knob. Then, the first vane member 400, whose gear portion 430 is gear-connected to the knob shaft gear 620, is rotated about the hinge shaft 410 in a direction of the rotation of the knob shaft gear 620. Then, as shown in FIG. 11, the upper vane 421 of the first vane member 400 is rotated frontwards, and the lower vane 422 of the first vane member 400 is rotated rearwards, and air is discharged in a direction of an arrow AD1. Accordingly, the air vent is operated such that the air introduced into the passage 110 through the air inlet is discharged toward the lower side of the interior through an upper side of the air outlet 111.

Figure 12:
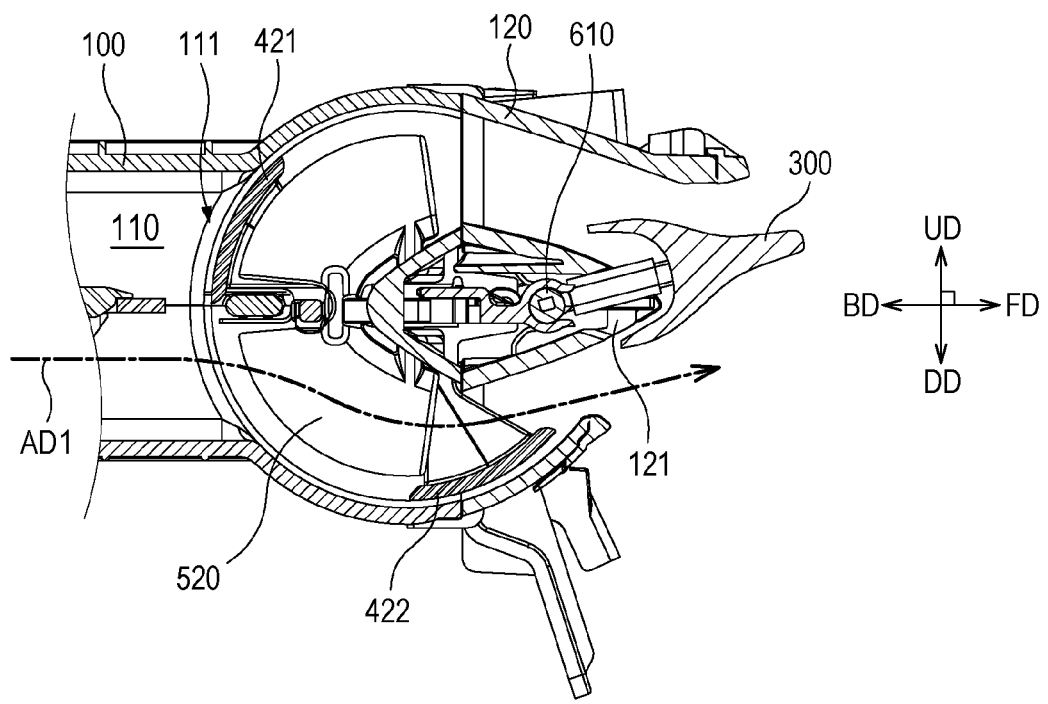
FIG. 12 shows an example where the air vent is operated to discharge air toward an upper side of an interior.

When the occupant wants to direct the wind direction toward an upper side of the interior, the occupant may rotate the knob 300 toward the upper side of the interior. Referring to FIGS. 2 and 12, as the knob is rotated toward the upper side of the interior, the knob shaft 610 and the knob shaft gear 620 are rotated together with the knob. Then, the first vane member 400, whose gear portion 430 is gear-connected to the knob shaft gear 620, is rotated about the hinge shaft 410 in a direction of the rotation of the knob shaft gear 620. Then, as shown in FIG. 12, the lower vane 422 is rotated frontwards, and the upper vane 421 is rotated rearwards, and air is discharged in a direction of an arrow AD2. Accordingly, the air vent is operated such that the air introduced into the passage 110 through the air inlet is discharged toward the upper side of the interior through a lower side of the air outlet 111.

Figure 13:
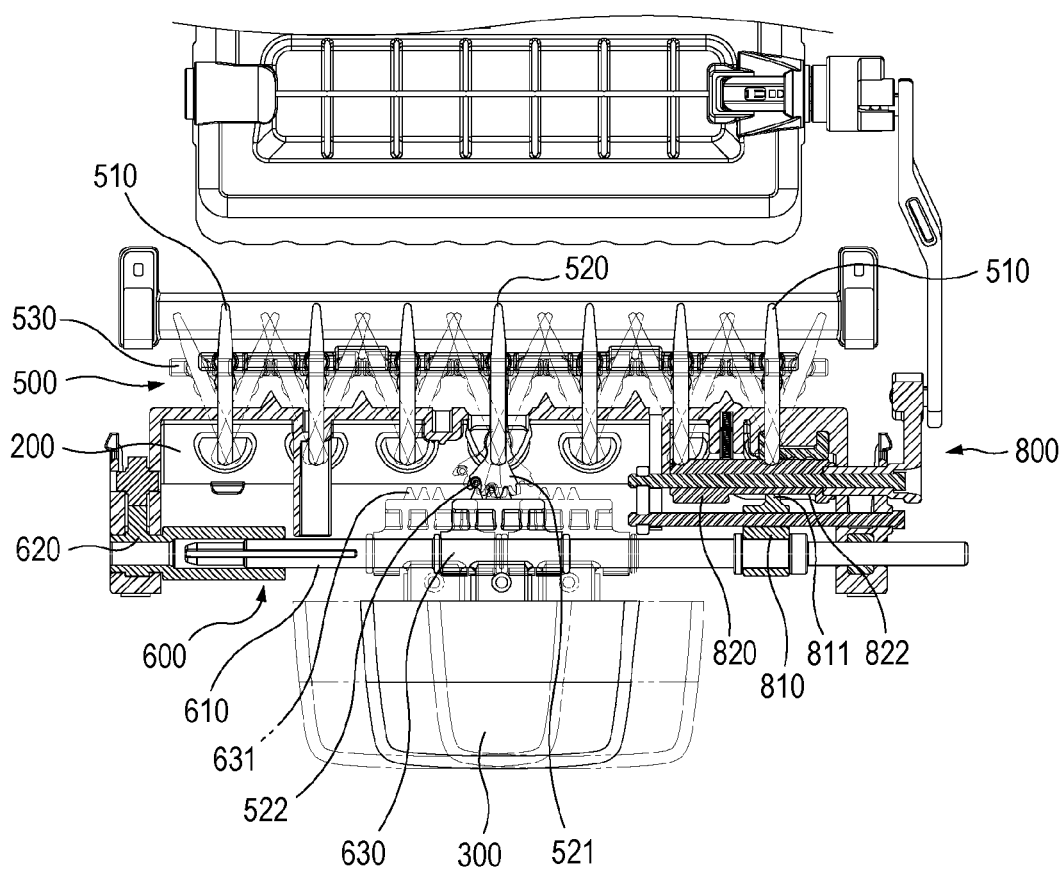
FIG. 13 shows an example where the air vent is operated to discharge air leftwards and rightwards by leftward and rightward movement of the knob.

Referring to FIGS. 2 and 13, the knob 300 may be manipulated leftwards or rightwards. Then, the knob shaft 610 and the vane rotating portion 630 are moved leftwards or rightward by the leftward or rightward movement of the knob. However, the knob shaft gear 620 fixed to the knob mount 200 is not moved when the knob shaft is moved leftwards or rightwards. As the vane rotating portion 630 is moved together with the knob shaft, the middle vane 520, whose pinion gear portion is in mesh with the rack gear portion of the vane rotating portion, is rotated in the movement direction of the knob shaft, and all the vanes of the second vane member are rotated through the link bar 530. Therefore, the second vane member 500 is rotated leftwards or rightwards due to the leftward or rightward movement of the knob shaft, thus adjusting the wind direction leftwards or rightwards.

Figure 14:
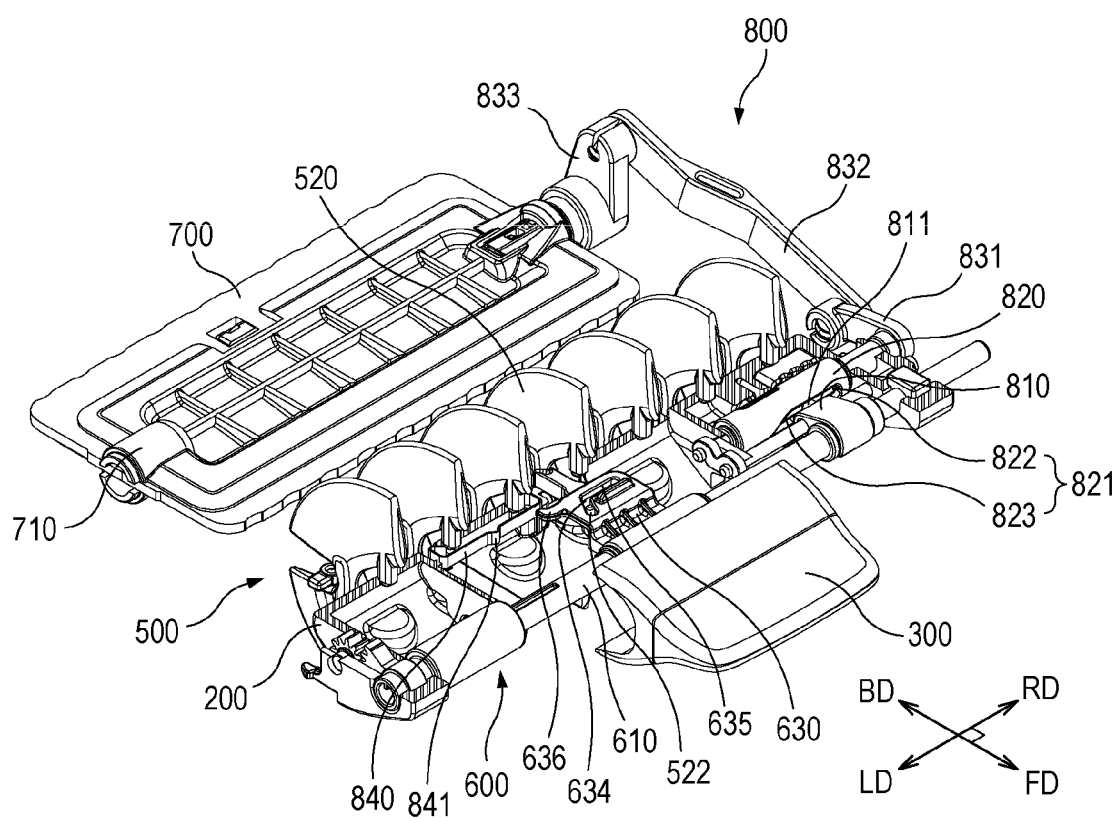
FIG. 14 is a perspective view showing a second vane member, a vane driving device, a damper, and a damper driving device.
Figure 15:
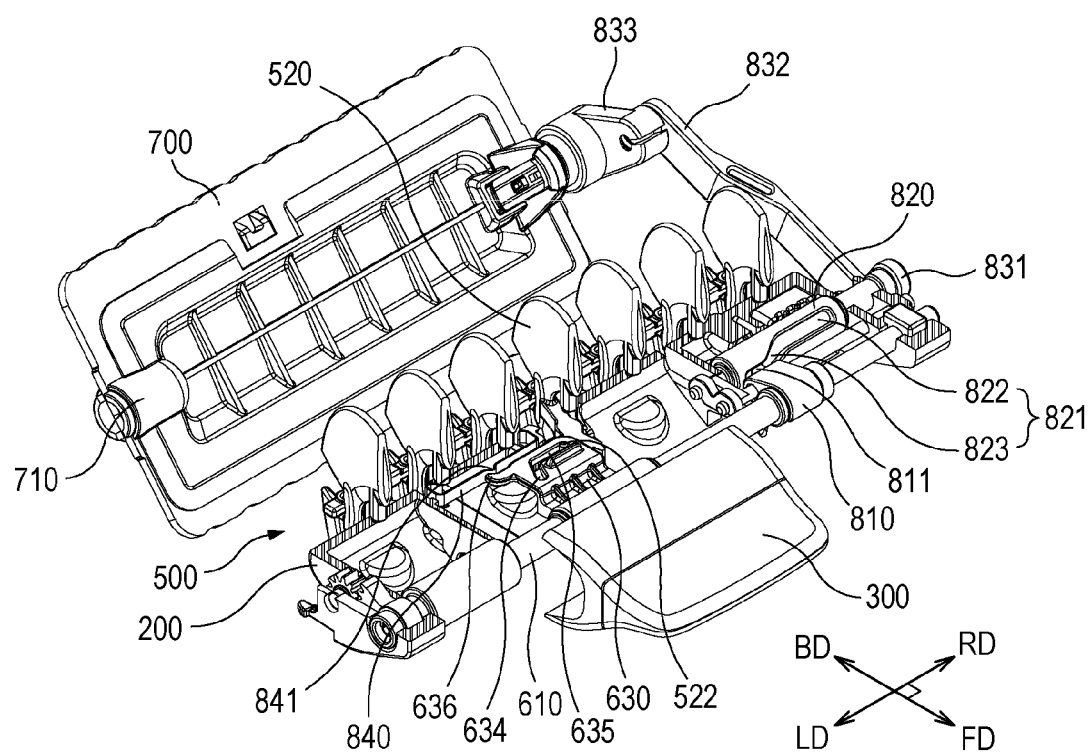
FIG. 15 is a perspective view showing an example where a damper is rotated to close a passage of a duct by the movement of a knob shaft.

The air introduced into the duct 100 through the air inlet 112 may be blocked by the damper 700 so as not to be supplied to the interior of an automobile. Referring to FIGS. 14 and 15, to block the passage of the duct by the damper 700, the occupant may push the knob 300 in a side direction (e.g., leftwards in FIG. 14). The occupant may push the knob 300 beyond a predetermined limit. Said predetermined limit means a limit that exceeds the movable range of the knob shaft for the leftward and rightward rotation of the vanes of the second vane member.

As the knob shaft is moved, the link pin of the middle vane 520 slides from a frontward end of the first slot to a rearward end of the first slot where the first slot connects with the second slot. Thus, said predetermined limit may correspond to the position of the knob when the link pin is positioned at the rearward end of the first slot during the movement of the knob shaft. Further, when the knob shaft reaches said predetermined limit, the pushing hook 636 of the vane rotating portion can be brought into contact with the projection 841 of the stopper 840.

The cam pin 811 of the cam driving portion 810 is positioned in the first cam groove 822 within the rotation range of the vanes of the second vane member and at a central position of the knob. As the knob shaft 610 is moved leftwards, the link pin 522 slides to the rearward end of the first slot 634, and, at the same time, each vane of the second vane member is rotated leftwards. If the knob shaft is further moved leftwards, the link pin 522 enters the second slot 635 from the first slot 634. Further, the pushing hook 636 comes into contact with the projection 841 of the stopper 840, and the stopper 840 may apply resistance to the movement of the knob shaft. If the knob shaft 610 is moved furthermore, the pushing hook is moved beyond the projection 841 and the link pin slides into the second slot. Since the second slot is parallel with the knob shaft, the vanes of the second vane member are not rotated any more in the state where the link pin 522 is positioned in the second slot 635.

Further, at the time when the link pin 522 enters the second slot 635, the cam pin 811 enters the second cam groove 823 from the first cam groove 822. As the knob is further moved leftwards, the cam pin slides along the second cam groove, and, at the same time, the cam 820 is rotated by the interaction between the cam pin and the second cam groove. The rotation of the cam 820 rotates the damper 700 about the bush shaft 710 through the first to third links 831, 832, 833. Therefore, the rotation of the cam 820, which is caused by the movement of the knob shaft 610, rotates the damper 700 and closes the passage 110 of the duct.

Further, the rotation angle of the cam 820 and the rotation angle of the damper 700 can be adjusted depending upon the movement range of the knob shaft 610 beyond the predetermined limit. Further, the knob shaft 610, which has been moved beyond the predetermined limit, can be moved to its original position. Then, the cam pin 811 returns to the first cam groove 822 from the second cam groove 823, and, at the same time, the cam 820 is rotated reversely. The reverse rotation of the cam 820 rotates the damper 700 such that the damper opens the passage.

As described above, the occupant in an automobile may use the air vent while easily adjusting the wind direction and opening or closing the passage by manipulating a single knob.

According to one embodiment of the present disclosure, as the knob is manipulated, the first vane member is rotated upwards or downwards to adjust the wind direction upwards or downwards. Further, the second vane member is rotated leftwards or rightwards to adjust the wind direction leftwards or rightwards. Thus, even when the size of the air vent is reduced, a sufficient amount of air can be supplied to the interior of an automobile. Further, the air vent can be freely installed in the interior of an automobile without limitation on an installation space, and the interior of the automobile can be easily designed with a desired design.

Although the present disclosure has been described in relation to some embodiments, it should be noted that there may be various modifications and changes without departing from the scope of the present disclosure, which can be understood by those skilled in the art. In addition, such modifications and changes should be construed as belonging to the scope of the claims appended herein.

What is claimed is:

1. An air vent for an automobile, comprising:
   a duct having a passage formed therethrough, the passage defining an air outlet and an air inlet;
   a knob mount fixedly coupled to the duct;
   a knob installed to the knob mount so as to be movable leftwards and rightwards and be rotatable upwards and downwards;
   a first vane member configured to be rotated upwards and downwards to adjust an upward and downward wind direction when the knob is rotated upwards and downwards;
   a second vane member configured to be rotated leftwards and rightwards to adjust a leftward and rightward wind direction when the knob is moved leftwards and rightwards;
   a vane driving device installed to the knob mount, the vane driving device being configured to transmit an upward and downward rotation of the knob to the first vane member such that the first vane member is rotated upwards and downwards, and to transmit a leftward and rightward movement of the knob to the second vane member such that the second vane member is rotated leftwards and rightwards; and
   a damper installed in a direction of the air inlet of the duct and configured to open or close the passage by rotation,
   wherein the vane driving device comprises:
      a knob shaft installed to the knob mount so as to be moved and rotated in a direction in which the knob is manipulated;
      a knob shaft gear installed to the knob shaft to rotate the first vane member, the knob shaft gear being configured to be rotated together with the knob shaft when the knob shaft is rotated upwards and downwards and not to be moved when the knob shaft is moved leftwards and rightwards; and
      a vane rotating portion coupled to the knob shaft and connected to the second vane member to rotate the second vane member leftwards and rightwards.

2. The air vent of claim 1, wherein the first vane member has a gear portion that is gear-connected to the knob shaft gear.

3. The air vent of claim 1, further comprising a damper driving device configured to interconnect the knob shaft with the damper and to rotate the damper by a movement of the knob shaft.

4. The air vent of claim 3, wherein the damper driving device comprises:
   a cam driving portion fixedly installed to the knob shaft and having a cam pin;
   a cam rotatably coupled to the knob mount and having a cam groove to which the cam pin is slidably inserted, the cam being configured to be rotated by interaction between the cam pin and the cam groove when the knob shaft is moved leftwards or rightwards; and
   a link mechanism configured to transmit a rotation of the cam to the damper to rotate the damper.

5. The air vent of claim 3, wherein the second vane member has a link pin spaced from a rotation center of the second vane member, and the vane rotating portion has a guide slot that allows the link pin to slide while being guided along the guide slot.

6. The air vent of claim 5, wherein the guide slot has a first slot extending obliquely with respect to the knob shaft, and a second slot extending from the first slot in parallel with the knob shaft,
- wherein the link pin slides along the first slot when the second vane member is rotated leftwards and rightwards, and
- wherein the link pin slides along the second slot when the second vane member is not rotated.

7. The air vent of claim 6, wherein the damper driving device further comprises:
- a stopper coupled to the knob mount, and
- wherein the stopper is configured to apply resistance to the movement of the knob shaft when the link pin enters the second slot from the first slot.

* * * * *